United States Patent
Chen et al.

(10) Patent No.: US 7,511,952 B2
(45) Date of Patent: Mar. 31, 2009

(54) COMPUTER ENCLOSURE WITH BRACKET FOR DATA STORAGE DEVICES

(75) Inventors: Yun-Lung Chen, Shenzhen (CN); Da-Long Sun, Shenzhen (CN); Bang-Chun Ding, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 255 days.

(21) Appl. No.: 11/309,040

(22) Filed: Jun. 13, 2006

(65) Prior Publication Data

US 2007/0139869 A1 Jun. 21, 2007

(30) Foreign Application Priority Data

Dec. 20, 2005 (CN) .................... 2005 2 0120942

(51) Int. Cl.
*G06F 1/16* (2006.01)
(52) U.S. Cl. .................................... 361/685
(58) Field of Classification Search .......... 361/685
See application file for complete search history.

(56) References Cited

U.S. PATENT DOCUMENTS

| 6,370,022 | B1 * | 4/2002  | Hooper et al. | 361/685 |
|-----------|------|---------|---------------|---------|
| 6,667,880 | B2 * | 12/2003 | Liu et al.    | 361/685 |
| 6,801,427 | B2 * | 10/2004 | Gan et al.    | 361/685 |
| 6,826,044 | B2 * | 11/2004 | Gan et al.    | 361/685 |
| 6,862,174 | B2 * | 3/2005  | Chien et al.  | 361/685 |
| 7,035,099 | B2 * | 4/2006  | Wu            | 361/685 |
| 7,036,783 | B2 * | 5/2006  | Chen et al.   | 361/685 |
| 7,092,249 | B2 * | 8/2006  | Wang          | 361/685 |
| 7,102,885 | B2 * | 9/2006  | Chen et al.   | 361/685 |
| 7,218,512 | B2 * | 5/2007  | Han           | 361/685 |
| 7,301,762 | B2 * | 11/2007 | Han           | 361/685 |

\* cited by examiner

*Primary Examiner*—Lisa Lea-Edmonds
(74) *Attorney, Agent, or Firm*—Wei Te Chung

(57) ABSTRACT

A computer enclosure includes a front panel and a bracket configured for receiving data storage devices therein. The bracket is accommodated in the computer enclosure. An opening is defined at the front panel for exposing the bracket. The bracket has a side wall covering the opening. A locking plate is pivotably attached to the bracket and locked with the front panel to thereby locking the bracket to the computer enclosure.

20 Claims, 5 Drawing Sheets

COMPUTER ENCLOSURE WITH BRACKET FOR DATA STORAGE DEVICES

FIELD OF THE INVENTION

The present invention relates to computer enclosures, and more particularly to a computer enclosure with a bracket for data storage devices.

DESCRIPTION OF RELATED ART

Usually, a bracket is fixed to a computer enclosure for securing storage devices. The bracket is generally installed on an inner surface of the computer enclosure.

For example, the computer enclosure generally includes a front panel. The front panel defines an opening therein. The bracket is installed on an inner surface of the front panel. The data storage devices are installed into the bracket through the opening of the front panel. However, in this computer enclosure, the bracket usually takes up a fairly large amount of space.

What is needed, therefore, is a computer enclosure with a bracket for improving usage of limited space of the computer enclosure.

SUMMARY OF THE INVENTION

A computer enclosure includes a front panel and a bracket configured for receiving data storage devices therein. The bracket is accommodated in the computer enclosure. An opening is defined at the front panel for exposing the bracket. The bracket has a side wall covering the opening. A locking plate is pivotably attached to the bracket and locked with the front panel to thereby locking the bracket to the computer enclosure.

Other advantages and novel features will become more apparent from the following detailed description of preferred embodiments when taken in conjunction with the accompanying drawings, in which:

DETAILED DESCRIPTION OF THE INVENTION

Figure 1:
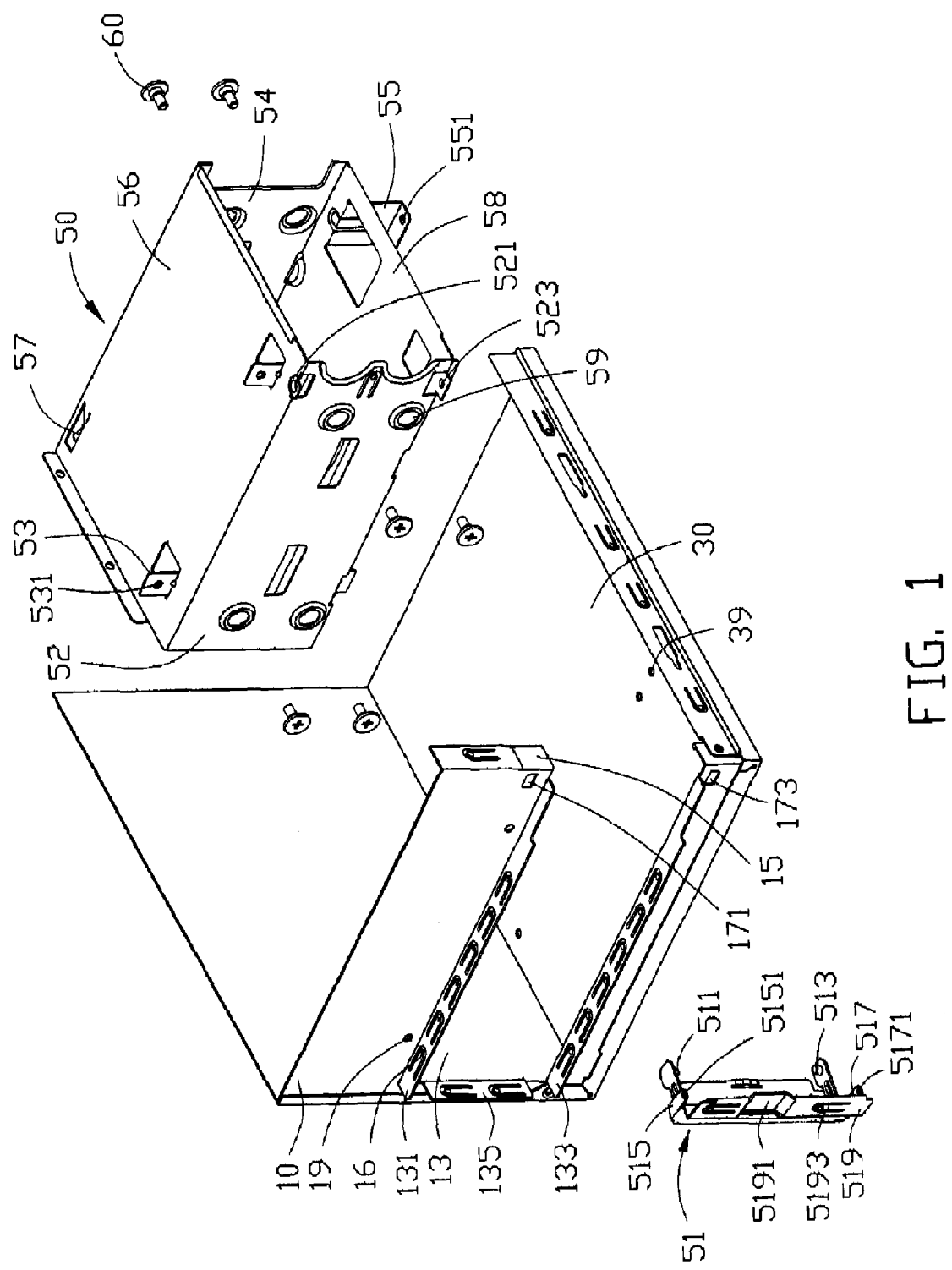
FIG. 1 is an exploded isometric view of a computer enclosure of a preferred embodiment of the present invention, the computer enclosure including a front panel, a bottom panel, a bracket, and a locking plate.

Referring to FIG. 1, a computer enclosure includes a front panel 10, a bottom panel 30, and a bracket 50.

A rectangular opening 13 is defined in a bottom of the front panel 10. A first flange 131 and a second flange 133 extend out from top and bottom edges of the opening 13 of the front panel 10 respectively. A third flange 135 extends out from a side edge of the front panel 10. The flanges 131, 133, 135 are perpendicular to the front panel 10. A fourth flange 15 extends inward from a side edge of the front panel 10. The fourth flange 15 is parallel to the third flange 135. Each of the flanges 131, 133, 135, 15 has a plurality of anti-EMI (electronic magnetic interference) clips 16. A first positioning hole 171 is defined in the front panel 10 above the first flange 131 far away from the third flange 135 on the front panel 10. A second positioning hole 173 is defined in the front panel 10 underneath the second flange 133 far away from the third flange 135. The front panel 10 defines two holes 19 above the first flange 131, and the bottom panel 30 defines two holes 39 therein.

The bracket 50 includes a top wall 56, a bottom wall 58, a first side wall 52, a second side wall 54, and a locking plate 51. The top wall 56, the bottom wall 58, and the side walls 52, 54 together form a space for accommodating data storage devices 90 (shown in FIGS. 3-5) therein. An entrance, through which the data storage devices 90 can enter into the bracket 50, is formed at one side of the bracket 50 and surrounded by the top wall 56, the bottom wall 58, and the side walls 52, 54. The first side wall 52 defines two pivot holes 521, 523. Two mounting plates 53 are defined at the top wall 56 of the bracket 50. Each mounting plate 53 defines a mounting hole 531 corresponding to one of the holes 19 defined in the front panel 10. An L-shaped supporting plate 55 with two mounting holes 551 (only one shown in FIG. 1) is formed on the bottom wall 58 of the bracket 50, corresponding to the holes 39 of the bottom panel 30. The bracket 50 has a plurality of clips 57 for securing the data storage devices 90. A plurality of holes 59 is defined in the first side wall 52 of the bracket 50. The locking plate 51 has two pivots 511, 513 for being inserted into the pivot holes 521, 523 of the bracket 50. A first finger 515 with a first protrusion 5151 extends from the middle of the top edge of the locking plate 51, and a second finger 517 with a second protrusion 5171 extends from the middle of the bottom edge of the locking plate 51. The locking plate 51 has a block flange 519. The block flange 519 has a protuberance 5191 and a plurality of EMI clips 5193.

Figure 2:
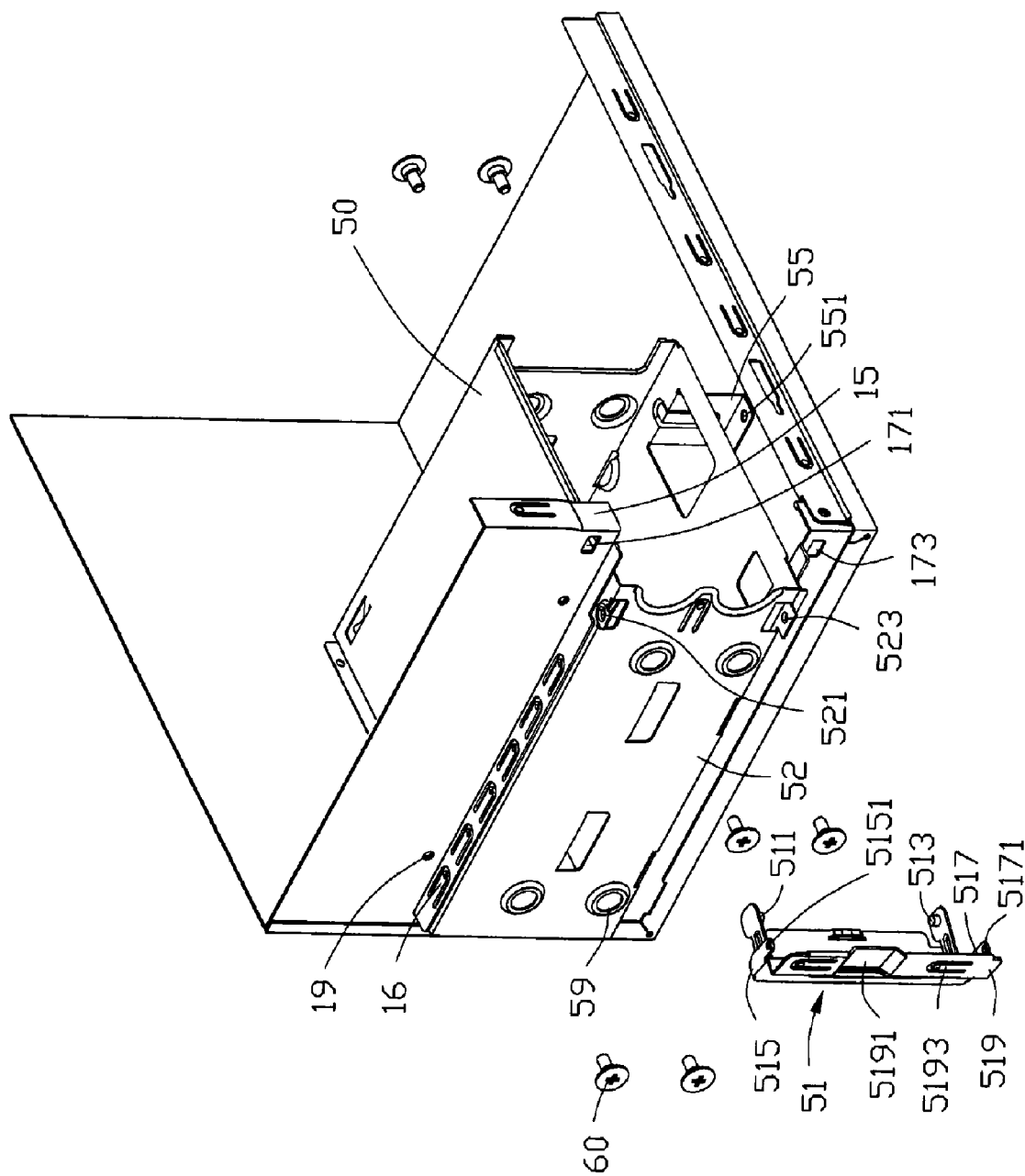
FIG. 2 is similar to FIG. 1, showing the bracket installed in the computer enclosure.
Figure 3:
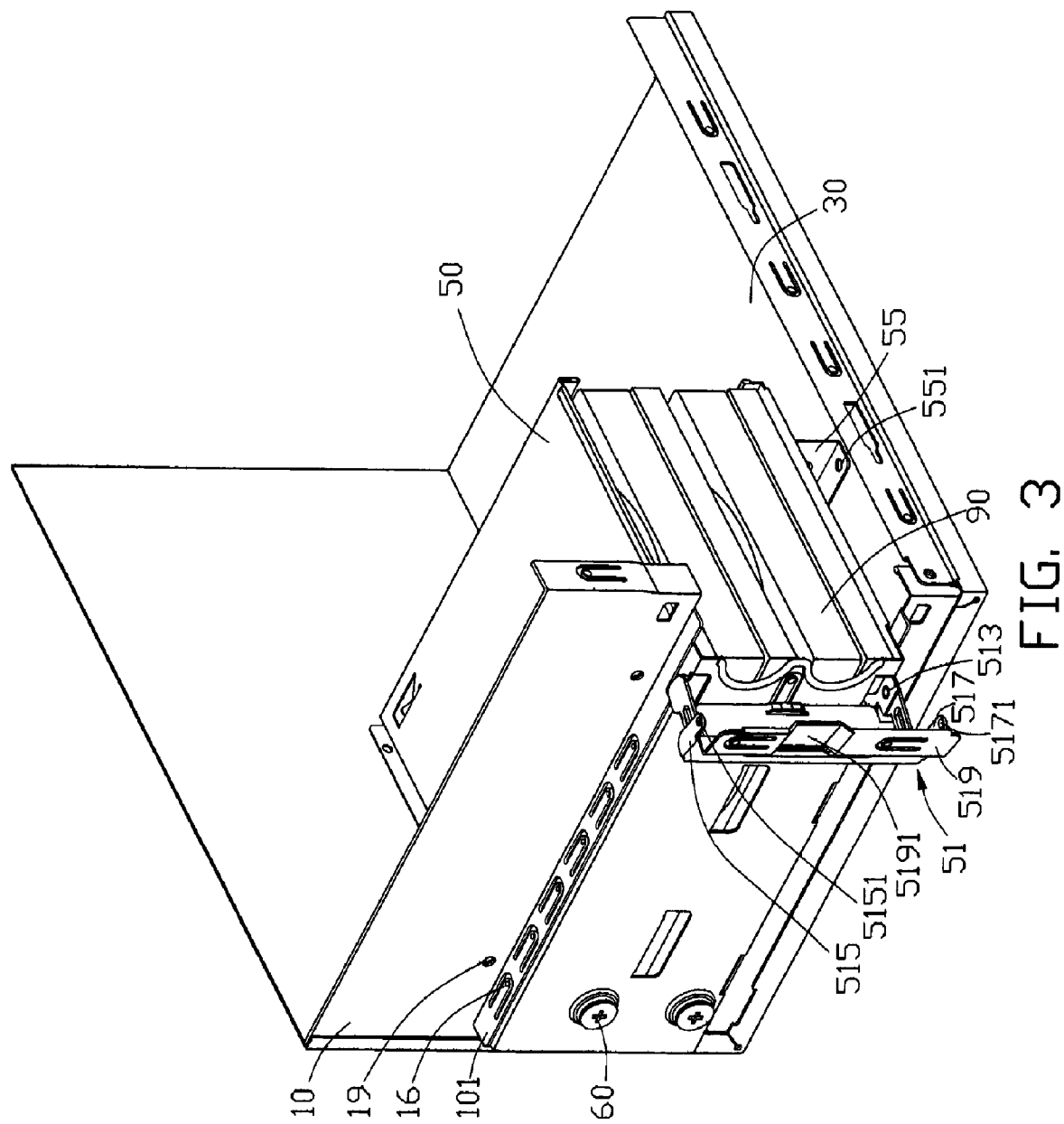
FIG. 3 is an assembled view of FIG. 1, including two data storage devices in the bracket, and the locking plate in an unlocked position.

Referring also to FIGS. 2 and 3, in assembly, the bracket 50 is received in the computer enclosure. The first side wall 52 of the bracket 50 extends out of the opening 13 of the front panel 10. The first and second flanges 131, 133 of the computer enclosure 30 abut against the top and bottom walls 56, 58 of the bracket respectively. The third flange 135 abuts against the bracket 50 at a location far away from the entrance. The forth flange 15 abuts against the bracket 50 at the entrance. The mounting plates 53 of the bracket 50 abut against an inner surface of the front panel 10, and the mounting holes 531 of the mounting plates 53 align with the respective holes 19 of the front panel 10. Two stakes (not shown) are inserted through the holes 19, 531 to fix the bracket 50 to the front panel 10. The mounting holes 551 of the bracket 50 align with the holes 39 of the bottom panel 30. Another stake (not shown) is inserted through the holes 39, 551 to secure the bracket 50 on the bottom panel 30. The bracket 50 is therefore locked in the computer enclosure. The pivots 511, 513 of the locking plate 51 are respectively engaged into the pivot holes 521, 523 of the bracket 50. Consequently, the locking plate 51 is pivotally attached on the bracket 50, and extends out of the computer enclosure.

Figure 4:
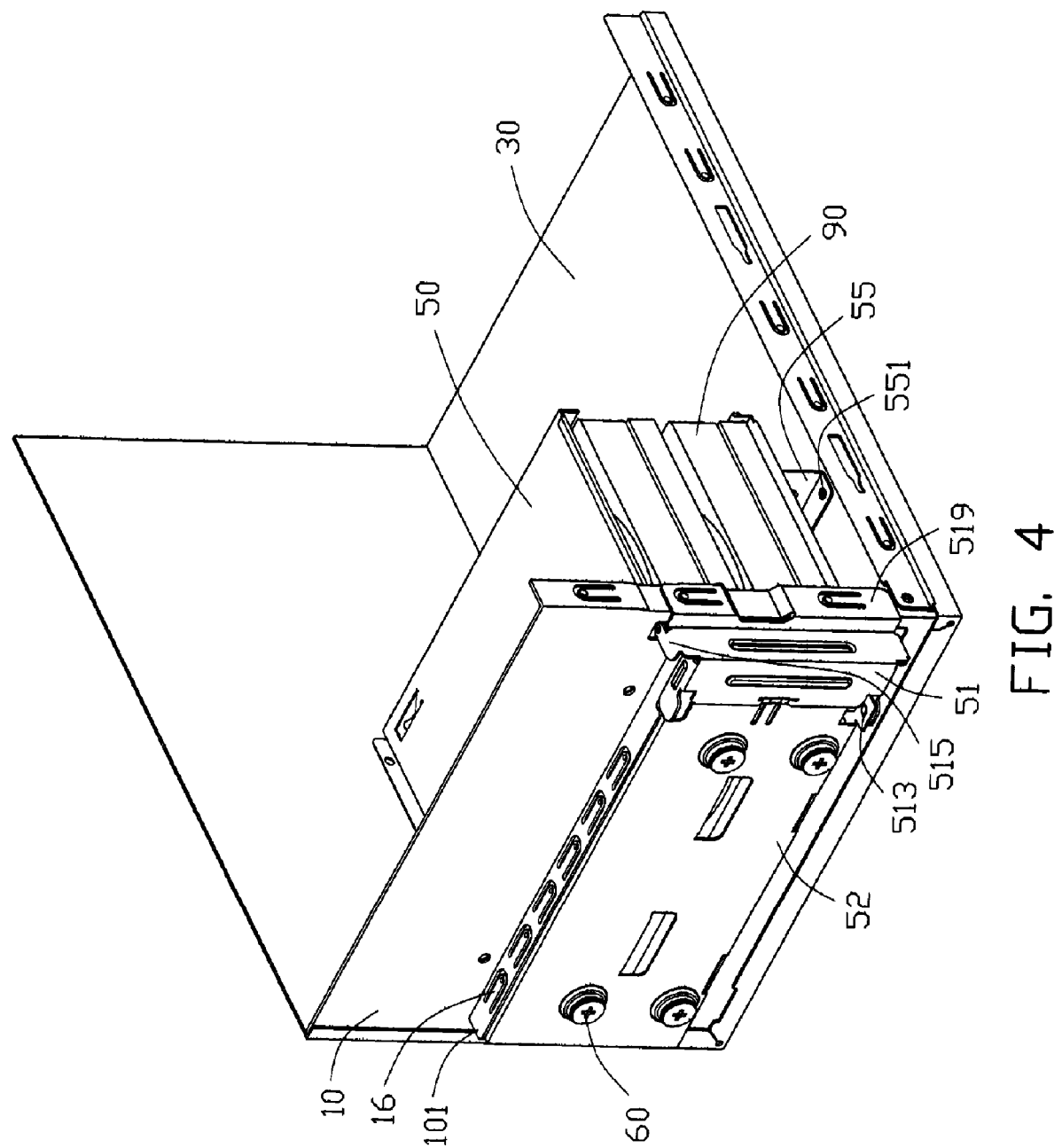
FIG. 4 is similar to FIG. 3, but showing the locking plate in a locked position.
Figure 5:
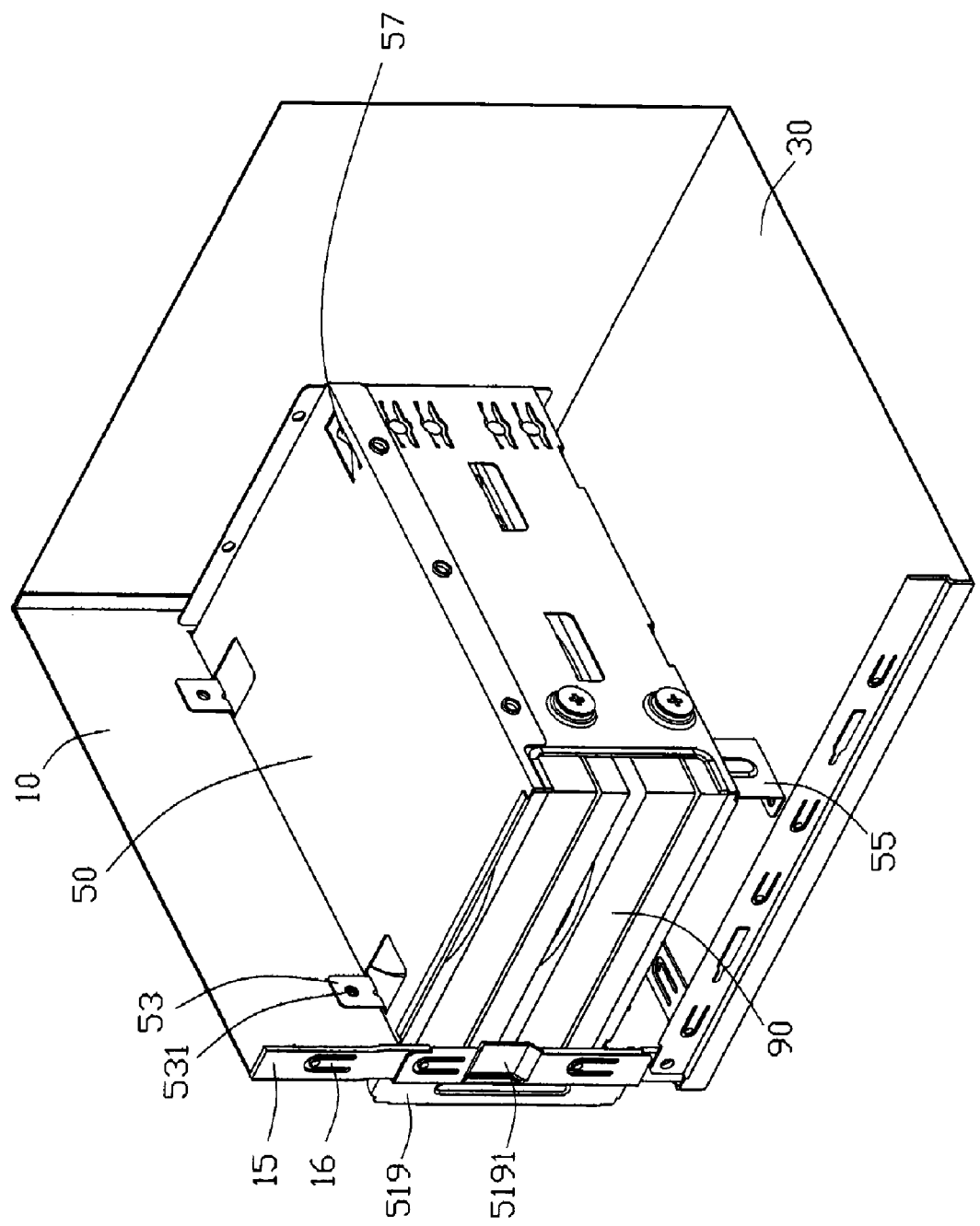
FIG. 5 is similar to FIG. 4, but viewed from another aspect.

Referring also to FIGS. 3 to 5, the data storage devices 90 are installed into the bracket 50. Screws 60 are engaged into the holes 59 of the bracket 50 to lock the data storage devices 90 in the bracket 50. The locking plate 51 is rotated in. The first finger 515 and the second finger 517 are wedged into the first positioning hole 171 and the second positioning hole 173 of the front panel 10 respectively. The first protrusion 5151 of the first finger 515 and the second protrusion 5171 of the second finger 517 are against edges of the first positioning hole 171 and the second positioning hole 173 respectively.

Meanwhile, the flange 519 of the locking plate 51 is substantially coplanar with the fourth flange 15 of the front panel 10, and the protuberance 5191 of the flange 519 resiliently engages the data storage devices 90.

It is to be understood, however, that even though numerous characteristics and advantages have been set forth in the foregoing description of a preferred embodiments, together with details of the structure and function of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A computer enclosure comprising:
   a front panel with an opening defined therein; and
   a bracket received into the opening of the front panel for enclosing data storage devices, the bracket having a side wall extending along a plane parallel to the front panel, the side wall covering and extending through the opening, wherein the bracket has two mounting plates each with a mounting hole, and the front panel has holes corresponding to the mounting holes.

2. The computer enclosure as claimed in claim 1, wherein the bracket comprises a locking plate with two pivots formed thereon, and the bracket has two holes for receiving the two pivots.

3. The computer enclosure as claimed in claim 2, wherein the front panel has first and second flanges extending out from top and bottom edges of the opening respectively, a third flange extending out from a side edge of the opening perpendicular to the top and bottom edges, and a fourth flange parallel to the third flange extending in from a side edge of the front panel, the flanges are all perpendicular to the front panel.

4. The computer enclosure as claimed in claim 3, wherein the locking plate has a block flange is substantially coplanar with the fourth flange of the front panel and configured for abutting against the data storage devices.

5. The computer enclosure as claimed in claim 2, wherein the locking plate has first and second fingers extending out from the top and bottom edges of the locking plate respectively, the first and second fingers respectively have a first protrusion and a second protrusion, and the front panel has first and second positioning holes for engaging with the first and second protrusions respectively.

6. The computer enclosure as claimed in claim 1, wherein the bracket has an L-shaped supporting plate extending from the bottom thereof, the supporting plate has a mounting hole, and the computer enclosure further compromises a bottom panel, the bottom panel has a hole aligning with the mounting hole of the supporting plate of the bracket.

7. A computer system comprising:
   a data storage device;
   a computer enclosure enclosing the data storage device, comprising a front panel; and a bracket installed on the front panel, the bracket having a pair of side walls parallel to the front panel, the side walls positioned on opposite sides of the front panel, the bracket receiving the data storage device between the side walls, wherein the front panel defines an opening, one of the side walls of the bracket extends out of the front panel through the opening and covers the opening.

8. The computer system as claimed in claim 7, wherein the bracket comprises a locking plate with two pivots formed thereon, and the bracket has two holes for receiving the two pivots.

9. The computer system as claimed in claim 8, wherein the front panel has first and second flanges extending out from top and bottom edges of the opening respectively, a third flange extending out from a side edge of the opening perpendicular to the top and bottom edges, and a fourth flange parallel to the third flange extending in from a side edge of the front panel, the flanges are all perpendicular to the front panel.

10. The computer system as claimed in claim 9, wherein the locking plate has a block flange for abutting on the fourth flange of the front panel.

11. The computer system as claimed in claim 8, wherein the locking plate has first and second fingers extending out from the top and bottom edge of the locking plate respectively, the first and second fingers respectively have a first protrusion and a second protrusion, and the front panel has first and second positioning holes for accommodating the first and second protrusions respectively.

12. The computer system as claimed in claim 7, wherein the bracket has two mounting plates each with a mounting bole, and the front panel has holes corresponding to the mounting holes.

13. The computer system as claimed in claim 7, further comprises a bottom panel, the bracket has an L-shaped supporting plate extending from the bottom thereof, the supporting plate has a mounting hole, and the computer enclosure further comprises a bottom panel, the bottom panel has a hole aligning with the mounting hole of the supporting plate of the bracket.

14. A computer system comprising:
    a computer enclosure comprising a plurality of panels one of which defines an opening;
    a bracket accommodated in the computer enclosure, the bracket comprising a pair of side walls with an entrance defined therebetween, one of the side walls covering the opening of the computer enclosure;
    a data storage device received in the bracket via the entrance; and
    a locking plate pivotably attached to one of the bracket and said one of the side walls covering the opening of the computer enclosure and locking with the other one of the bracket and said one of the side walls covering the opening of the computer enclosure to thereby lock the bracket to the computer enclosure.

15. The computer system as claimed in claim 14, wherein the front panel has first and second flanges extending outwardly from top and bottom edges of the opening respectively, the first and second flanges abutting against top and bottom sides of the bracket respectively.

16. The computer system as claimed in claim 15, wherein a third flange extends outwardly from the front panel at the opening, the locking plate comprises a blocking flange, the third flange abutting against the bracket at a location far away from the entrance and the blocking flange abutting against the data storage device at the entrance.

17. The computer system as claimed in claim 16, wherein a fourth flange extends inwardly from the front panel at the opening, the fourth flange abutting against the bracket at the entrance.

18. The computer system as claimed in claim 17, wherein at least one anti-EMI clip is formed at each of the flanges.

19. The computer system as claimed in claim 14, wherein the bracket comprises a mounting plate abutting against an inner side of the front panel.

20. The computer system as claimed in claim 14, wherein the bracket comprises a supporting plate extending downwardly therefrom, the supporting plate seated on a bottom panel of the computer enclosure.

* * * * *